R. L. SHERMAN.
ADJUSTABLE STRAINER FOR COOKING VESSELS.
APPLICATION FILED DEC. 19, 1916.

1,241,448.

Patented Sept. 25, 1917.

Witness
Will Freeman.

Inventor.
Ralph L. Sherman
By Ourig & Bair Attys.

UNITED STATES PATENT OFFICE.

RALPH L. SHERMAN, OF DES MOINES, IOWA.

ADJUSTABLE STRAINER FOR COOKING VESSELS.

1,241,448. Specification of Letters Patent. Patented Sept. 25, 1917.

Application filed December 19, 1916. Serial No. 137,758.

*To all whom it may concern:*

Be it known that I, RALPH L. SHERMAN, a citizen of the United States, and resident of Des Moines, in the county of Polk and State of Iowa, have invented a certain new and useful Adjustable Strainer for Cooking Vessels.

The object of my invention is to provide an adjustable strainer of simple and inexpensive construction for cooking vessels.

A further object is to provide such a strainer having parts so arranged and constructed and so adjustable with relation to each other as to permit the strainer to be readily and easily adjustably mounted on cooking vessels of various sizes without the use of special tools or the like and without the selection of special vessels for use with the strainer.

A further object is to provide such a device having its parts arranged as above mentioned, having a handle member so arranged that when the strainer is mounted on a cooking vessel, the handle can be used for manipulating the entire vessel with the strainer thereon.

My invention consists in the construction, arrangement and combination of the various parts of the device, whereby the objects contemplated are attained, as hereinafter more fully set forth, pointed out in my claims and illustrated in the accompanying drawings, in which:

Figure 1:
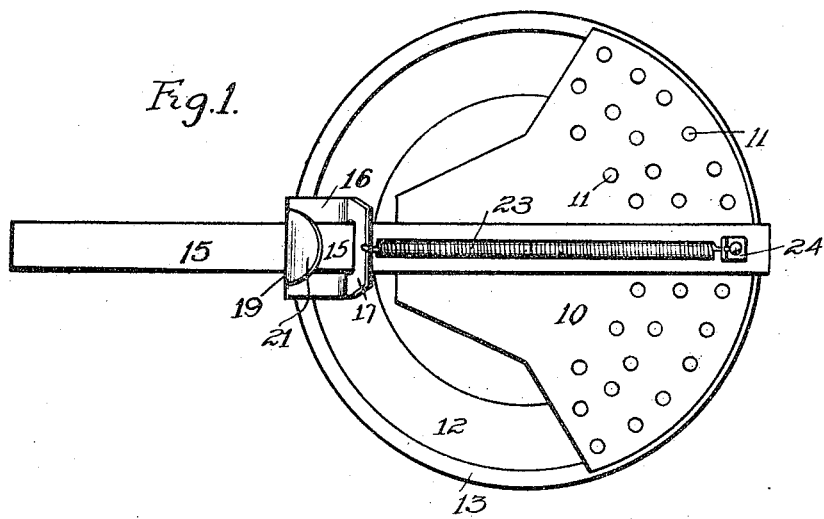
Figure 1 shows a top or plan view of the cooking vessel having my improved removable strainer installed thereon.
Figure 3:
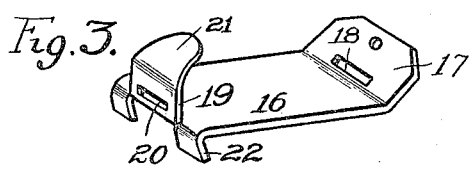
Fig. 3 shows a perspective view of one of the parts of my device.

In the accompanying drawings, I have used the reference numeral 10 to indicate a part of my strainer which has substantially the form of a flat plate made generally in the form of a sector of a circle and provided with suitable perforations or the like 11.

My improved strainer is designed to be mounted on a cooking vessel 12.

Figure 2:
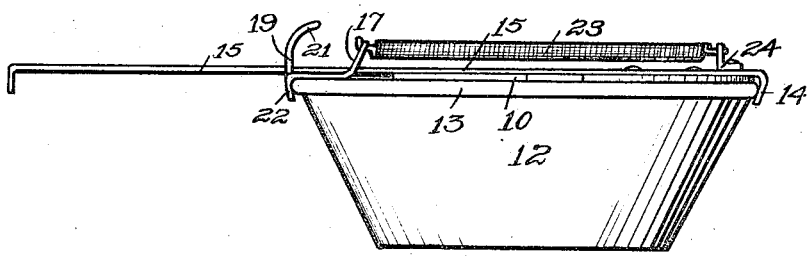
Fig. 2 shows a side elevation of the same.

It is well known that a great number of cooking vessels have at their upper edges an outwardly extending rib or the like 13. My improved strainer is provided near one edge with a downwardly extended hook member 14, designed to fit over and slightly around the rib 13, as shown in Fig. 2.

The strainer member 10 is provided with a handle or the like 15 extending away from the strainer member 10 preferably in a substantially horizontal plane from the edge of the strainer member 10 opposite the hook member 14.

The handle member 15 is designed to extend considerably beyond the cooking vessel 12.

Slidably mounted on the handle 15 is a flat plate 16 having at one end an upwardly inclined portion 17. The member 16 is designed to rest below the handle 15 with said handle extending through a horizontal slot 18 in the upwardly extending portion 17.

At the other end of the plate 16 is an upwardly extending portion 19 having a small slot 20 to receive said handle, whereby said plate 16 is slidably mounted on the handle.

At the upper end of the extension 19 is a tongue or the like 21 extended away from the free end of the handle 15, as illustrated in Figs. 1 and 2 for affording a firm grip for the user of the device, and for permitting the user to grasp the handle 15 and adjust the sliding plate with one hand.

The plate 16 is provided near the upward extension 19 with a pair of downwardly extending hook members 22 designed to extend over and around the rib 13, as shown in Fig. 2.

Secured to the extension 17 is a coil spring 23, the other end of which is secured to a suitable bracket 24 preferably made of a short piece of angle iron, and fixed with relation to the strainer member 10.

It will be seen that by grasping the handle 15 and sliding the plate 16, the distance between the hook members 22 and the hook member 14 may be varied considerably for gripping between the hook member 14 and the hook members 22 the upper edges of cooking vessels of different diameters.

The spring 23 is of such length as to cause the hook members 22 and 14 to firmly grip the cooking vessel so as to permit the cooking vessel with my improved strainer thereon to be lifted and handled by means of the handle 15.

Some changes may be made in the construction and arrangement of the various parts of my improved device, with out departing from the essential features and purposes thereof, and it is my intention to cover by this application any such modified forms of structure or use of mechanical equivalents as may reasonably be included within the scope of my claims.

I claim as my invention:

1. In a device of the class described, a perforated strainer member having a hook member extending downwardly from one edge, a handle extending away from the opposite edge of said strainer member, a plate slidably mounted on said handle having at its ends a pair of spaced upwardly extending members provided with slots to receive said handle and having downwardly extending hook members, and a spring having one end secured to said plate, and the other end fixed on said handle, one of said upwardly extending members being accessible to the fingers of a hand grasping said handle, whereby the strainer may be installed on a cooking vessel with one hand.

2. In a device of the class described, a perforated strainer member, a cooking member engaging device extending downwardly from one edge of said strainer member, a handle secured to said strainer member and extending away from the opposite edge thereof, a sliding member mounted on said handle having means thereon for engaging and gripping the cooking member, a yielding device secured at one end to said sliding member, and having its other end fixed on said handle, said sliding member having a member adapted to be engaged by the hand whereby the sliding member may be manipulated by a hand grasping said handle.

Des Moines, Iowa, December 7, 1916.

RALPH L. SHERMAN.

Copies of this patent may be obtained for five cents each, by addressing the "Commissioner of Patents, Washington, D. C."